United States Patent [19]
Best et al.

[11] Patent Number: 5,632,371
[45] Date of Patent: May 27, 1997

[54] EXPANDABLE REDUNDANTLY POWERED CONVEYORS

[75] Inventors: John W. Best; Bob K. Flippo; James D. Walker; Gary D. Carter, all of Jonesboro, Ark.

[73] Assignee: Northstar Industries, Inc., Jonesboro, Ark.

[21] Appl. No.: 349,544

[22] Filed: Dec. 5, 1994

Related U.S. Application Data

[63] Continuation-in-part of Ser. No. 341,462, Nov. 17, 1994, Pat. No. 5,456,347, which is a continuation of Ser. No. 22,012, Feb. 24, 1993, abandoned.

[51] Int. Cl.$^6$ .................................................. B65G 13/06
[52] U.S. Cl. .................................... 198/781.1; 193/35 TE
[58] Field of Search ................................. 198/782, 790, 198/781.1; 193/35 TE

[56] References Cited

U.S. PATENT DOCUMENTS

| | | | |
|---|---|---|---|
| 1,725,740 | 8/1929 | Schulte | 198/788 |
| 2,915,167 | 12/1959 | Berger | 198/788 |
| 3,242,342 | 3/1966 | Gabar | 198/502.2 |
| 3,276,558 | 10/1966 | Guske et al. | 193/35 TE |
| 4,852,712 | 8/1989 | Best | 193/35 TE |
| 4,887,707 | 12/1989 | Harms | 198/790 X |
| 5,042,644 | 8/1991 | Davis | 198/781 |
| 5,060,785 | 10/1991 | Garrity | 198/781 |
| 5,147,025 | 9/1992 | Flippo | 198/782 |
| 5,224,584 | 7/1993 | Best et al. | 198/782 |
| 5,456,347 | 10/1995 | Best et al. | 193/35 TE X |
| 5,456,348 | 10/1995 | Whetsel et al. | 198/782 X |

FOREIGN PATENT DOCUMENTS

| | | | |
|---|---|---|---|
| 4107 | 1/1987 | Japan | 193/35 TE |

*Primary Examiner*—David A. Bucci
*Attorney, Agent, or Firm*—James L. Ewing, IV; Kilpatrick Stockton LLP

[57] ABSTRACT

Expandable powered conveyors featuring a number of roller power motors located externally of the rollers. The conveyors include a pair of lazy tong trusses which may be supplemented, as desired, by telescoping rigid frames, leg structures or other structures. The motors are mounted between the trusses so that their drive pulleys are located substantially coaxial to the middle connection points of the scissor bars in the trusses and thus maintain a substantially constant distance from rollers connected to those scissor bars. Drive belts connect the motor drive pulleys to power such rollers. The conveyors also include a number of transfer pulleys which are also mounted substantially coaxial to corresponding middle connection points of the trusses. A single motor may thus power one or more rollers directly, and other rollers indirectly via motor drive belts and transfer drive belts. Use of a number of motors allows grouping of rollers into zones with the same advantages enjoyed in more expensive internally powered roller conveyors, but with greater reliability, ease of maintenance and savings and expense. Among those advantages are independent control of roller zones for accumulation of product and other purposes.

33 Claims, 4 Drawing Sheets

EXPANDABLE REDUNDANTLY POWERED CONVEYORS

This is a continuation-in-part of U.S. patent application Ser. No. 08/341,462, filed Nov. 17, 1994, now U.S. Pat. No. 5,456,347, which is in turn a continuation of U.S. patent application Ser. No. 08/022,012 to Best, et al. filed Feb. 24, 1993, entitled "Controllably Powered Roller Conveyors, now abandoned."

The present invention relates to expandable conveyors which employ elongated rollers powered by a number of motors, drive belts and transfer belts.

BACKGROUND OF THE INVENTION

Expandable conveyors are widely and conventionally employed to convey items such as corrugated containers of product in warehouses, manufacturing facilities and other locations. For example, expandable conveyors may be employed at the terminus of conveyor branches in a warehousing rigid and fixed conveyor distribution system to extend from the branches of the central conveyor system in flexible fashion in order to accommodate various trucks and shipping containers. The conveyors may be moved, for instance, back and forth, left and right in order to accommodate the locations in which a truck is parked and to direct the stream of items to the particular portion of the truck being filled.

Expandable conveyors often take the form of scissors or "lazy tongs" structures. These conventionally contain a pair of scissor structures which act as expandable load bearing members spanned by a plurality of elongated rollers. The members forming the scissors structures are usually connected at substantially their top and bottom portions and their mid-portions to each other to provide proper linkage, expandability and strength. Various connections may be omitted, such as mid-point connections, for manufacturing efficiency and other purposes.

Such expandable roller conveyors are disclosed in, for instance, U.S. Pat. No. 4,852,712 issued Aug. 1, 1989 to Best entitled "Conveyor" which discloses an extensible lazy tong conveyor. U.S. Pat. No. 5,147,025 issued Sep. 15, 1992 to Flippo, entitled "Expandable Powered Roller Conveyor" discloses powered expandable conveyors featuring a drive motor and one or more belts or chains connected to the drive motor and to multiple rows of skate wheels or elongated rollers. U.S. Pat. No. 5,224,584 issued Jul. 6, 1993 to Best, et al., entitled "Expandable Powered Conveyors" discloses powered conveyors in which the power unit is located external to the rollers and connected to them via a number of chains or belts. U.S. patent application Ser. No. 08/022,012 to Best, et al. filed Feb. 24, 1993, entitled "Controllably Powered Roller Conveyors" discloses powered lazy tong conveyors in which the power units are located within, or internally of, the rollers. All of these patent documents are incorporated herein by this reference.

The configurations disclosed in U.S. Pat. Nos. 5,147,025 and 5,224,584 mentioned above employ lengthy drive belts or chains which engage a motor sprocket or pulley and connect to a number of rows of skate wheels or elongated rollers. Among other things, a belt or chain failure subjects the entire conveyor to a power failure. Furthermore, such a power transmission means can preclude segmenting the conveyor into a number of independently powered zones so that accumulation techniques may be employed. However, such configurations are preferable to the extent they use large, conventional drive motors mounted external to the rollers; the motors are easily accessible, more durable and less expensive than smaller motors such as ones inside the rollers.

U.S. patent application Ser. No. 08/022,012 mentioned above discloses another approach: that of expandable conveyors in which the rollers feature internal motors. This approach allows individual control over power applied to each motorized roller simply by changing the electrical power to the roller. It allows, accordingly, creation of independently actuable and controllable power zones so that accumulation techniques may be employed. However, the smaller, internal motors are expensive, less reliable, and more difficult to maintain than external motors of the type mentioned in U.S. Pat. Nos. 5,147,025 and 5,224,584.

SUMMARY OF THE PRESENT INVENTION

Expandable powered conveyors of the present invention feature a number of motors mounted external of the rollers for increased accessibility, durability and savings. The motors are mounted internally in the lazy tong structure so that their drive pulleys are coaxial with the middle connections of the scissor bars and are thus substantially a constant distance from the roller axis regardless of the degree to which the conveyors have been expanded. Drive belts connect each motor to one or more first rollers. Additionally, the conveyors include a number of transfer pulleys each of which are mounted coaxial to the scissor bar middle connections so that they, too, are always the same distance from the rollers. A number of transfer belts connect successive rollers and transfer pulleys to first rollers so that a drive motor may power a number of first rollers more directly via one or more motor drive belts, and less directly via the motor drive belts and the transfer drive belts. Accordingly, a succession of first drive rollers and successive drive rollers, together with their motor drive belts and transfer drive belts, may form a zone which is independently actuable and controllable so that the conveyor features advantages similar to the more expensive conveyors which include zones of internally powered rollers. Yet conveyors according to the present invention are generally less expensive, more reliable, and easier to maintain than internally powered roller conveyors.

Motors and transfer pulleys may be connected to the lazy tong structures via cradles which connect in quick release fashion to lateral members that span the lower connections of the scissor bars. Similarly, the elongated rollers may fit in quick disconnect fashion to the lazy tong structures using a plurality of vertical bars. These quick disconnect features allow efficient repair of components and replacement of drive belts. Advantageously, most of the conveyor continues to be powered even if one motor drive belt or transfer drive belt may happen to fail.

It is accordingly an object of the present invention to provide expandable powered conveyors which feature a number of motors external to the rollers and connected to rollers in zones for increased reliability, control and enhancement of accumulation techniques.

It is an additional object of the present invention to provide expandable powered conveyors with power zones, but each zone powered using external motors rather than motors internal to the rollers for better savings, durability and maintenance.

It is a further object of the present invention to provide expandable powered conveyors which employ more than one drive motor for increased redundancy, control and enhancement of accumulation techniques.

It is a further object of the present invention to provide expandable powered conveyors which are reliable, durable, inexpensive and easy to maintain.

Other objects, feature and advantages of the present invention will become apparent with respect to the remainder of this document.

DETAILED DESCRIPTION OF THE DRAWINGS

Figure 1:
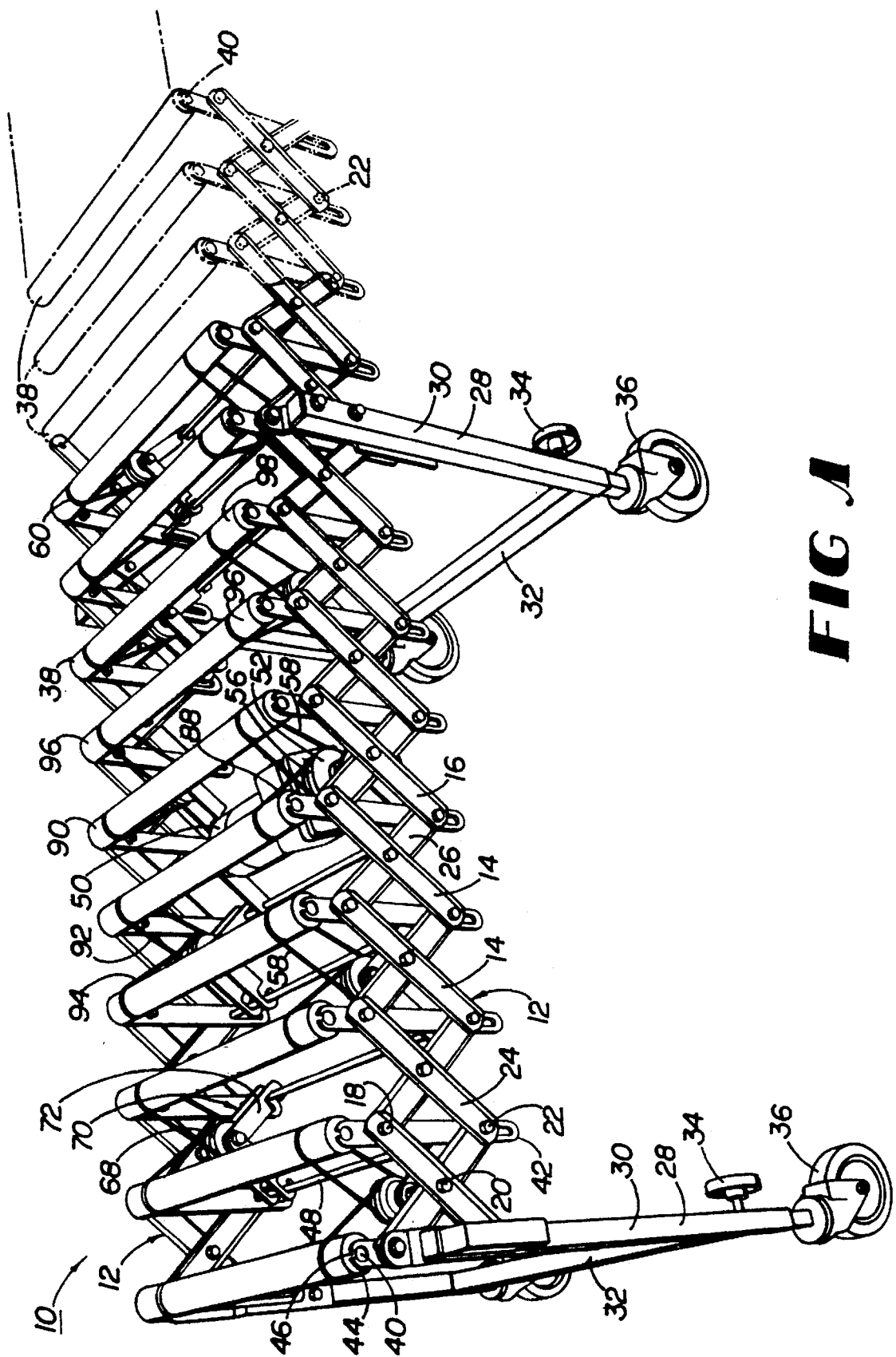
FIG. 1 is a perspective view of a first embodiment of an expandable powered conveyor according to the present invention.

FIG. 1 is a perspective view of a first embodiment of a conveyor 10 according to the present invention. Conveyor 10 comprises a pair of trusses 12 each of which may be formed as disclosed in U.S. Pat. No. 4,852,712 discussed and incorporated by reference above. Each truss contains a first set 14 of scissor bars, each of which extends generally in a first diagonal direction. Each scissor bar 16 preferably contains an upper connection point 18 in its upper portion, a middle connection point 20 and a lower connection point 22 in its lower portion. Connection points 18, 20 and 22 may be holes or as otherwise desired. Scissor bars 16 are preferably formed of extruded aluminum as disclosed in U.S. Pat. No. 4,852,712, and preferably include flanges 24 as disclosed in that document for additional strength. They may be formed of any desired material, however. A second set 26 of scissor bars connects to the first set 14; the scissor bars 16 in the second set 26 extend generally diagonally to the scissor bars 16 in the first set 14. Scissor bars 16 in the first set 14 are connected to scissor bars 16 in the second set 26, preferably at their upper connection points 18, middle connection points 20 and lower connection points 22 although all of then need not be so connected (and in some structures, middle connection points 20 may be omitted altogether). Thus, as shown in FIG. 1, a particular scissor bar 16 in first set of scissor bars 14 connects to a first scissor bar 16 in the second set 26 at its upper connection point 18; a second scissor bar 16 in the second set 26 at its middle connection point 20 and a third scissor bar 16 in second set 26 at its lower connection point 22.

Trusses 12 may be supported, as desired, by other structure, such as, for instance, telescoping channels which allow greater strength and redundancy in conveyor 10 so that it may handle heavier loads with greater reliability.

The scissor bars 16 may be connected by bolts, rivets or other fasteners as desired; they are preferably connected via nuts and bolts using lock washers as desired, together with other washers as desired.

The trusses 12 may be supported in conventional fashion with leg structures 28. A leg vertical member 30 may be, for instance, connected in pivotal fashion to an upper connection point 18 and in sliding fashion to a lower connection point 22 so as to extend vertically beneath truss 12 regardless of the degree of extension of the truss. Cross member 32 may connect corresponding leg vertical members 30 in the pair of trusses 12. The leg vertical members 30 may be telescoping using locking screws 34 as shown. Conventional casters 36 or other rollers, which may be adapted to swivel and which may include brakes, may be placed on the extremities of leg vertical members 30.

The trusses 12 are disposed sufficiently far enough apart to support a number of elongated rollers 38 which are connected, directly or indirectly, to upper connection points 18 on the trusses 12. Elongated rollers 38 may be conventional, and conventionally mounted via bearings on bushings or the like on axles 40 which may, but need not, extend completely through rollers 38. Axles 40 may form a portion of the fasteners which are employed at upper connection points 18, if desired. Preferably, however, a plurality of vertical bars 42 supplements trusses 12 by connecting the corresponding upper connection points 18 and lower connection points 22 and, if desired, extending in height above and/or below those points. Vertical bars 42 are preferably pivotally connected at upper connection point 18 and connected in sliding fashion to lower connection point 22 so that they remain substantially vertical as trusses 12 and conveyor 10 are expanded and retracted. The upper portions 44 of vertical bars 42 contain quick disconnect structure 46, which may be slots into which bolts threaded into axles 40 of rollers 38 fit. Axles 40 themselves may fit in the slots 46, or any other desired structure connecting to rollers 38 or axles 40. Accordingly, vertical bars 42 lend truss structures 12 significant strength, and they also provide a convenient means for mounting rollers 38 so as to allow quick and easy removal of the rollers for maintenance, replacement and/or repair of drive belts, motors, pulleys and other components as discussed more fully below.

Also spanning trusses 12 are a plurality of lateral members 48. These preferably span lower connection points 22, but some or all may span middle connection points 20. Lateral members 48 preferably form a portion of the fasteners employed in these connection points, but bolts or other components to lateral members 48 may alternatively serve that purpose. Lateral members 48 add lateral strength to conveyor 10, but they may also serve to support other components of conveyor 10.

A number of drive motors 50 are mounted between trusses 12. In the preferred embodiment, such motors are ⅛ horsepower motors (Model GPP12543 90 volt d.c. permanent magnet, providing approximately 58 inch-pounds of torque) manufactured by the Baldor Manufacturing Company. Each motor 50 features a drive pulley 52 mounted on its shaft 54, which pulley 52 may contain one or more channels 56, each for accommodating a drive belt 58. Belts may be of any desired length and material; those in the preferred embodiment are manufactured by Pyramid, Inc of Newton, Iowa (522 North 9th Ave. East 50208). Such preferred embodiment belts are formed of polyurethane material; they have 0.187 inch diameter. In the preferred embodiment, motor drive belts 88 are 15 inches long and have an approximate 92 durometer value; transfer drive belts 92 and 94 are 12.625 inches long and have an approximate 83 durometer value.

Figure 4:
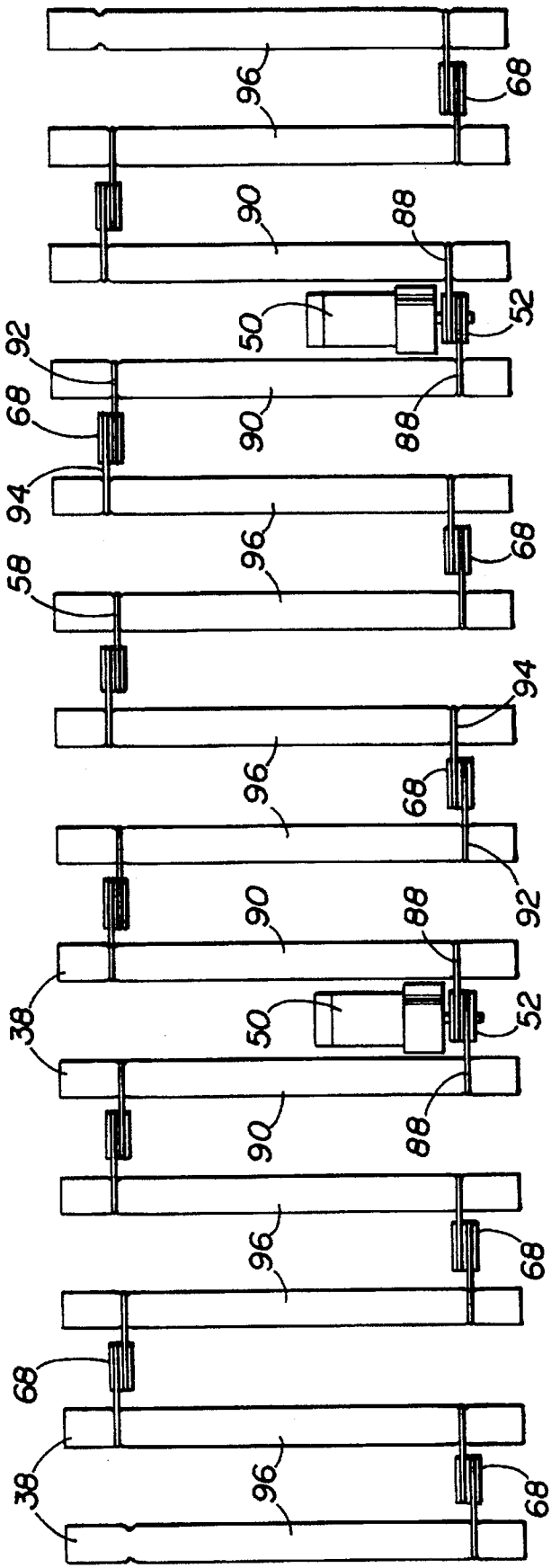
FIG. 4 is a schematic top plan view of a portion of the conveyor of FIG. 1.

Motors 50 are mounted so that drive pulleys 52 are substantially coaxial to corresponding middle connection points 20 of trusses 12. In this fashion, the distance from the axis of the drive pulley 52 will remain substantially the same from the axis of elongated rollers 38 connected at the upper connection points 18 of the bars 16 of whose middle connection point 20 motors 50 pulley 52 is coaxial. Accordingly, belts 58 connecting drive pulley 52 to such rollers 38, as by threading grooves 60 in those rollers as shown in FIGS. 1 and 4, may be of substantially constant length, although there is obviously some variance in length as shown in FIG. 1 due to roller 38 axis being slightly above upper connection points 18.

Figure 2:
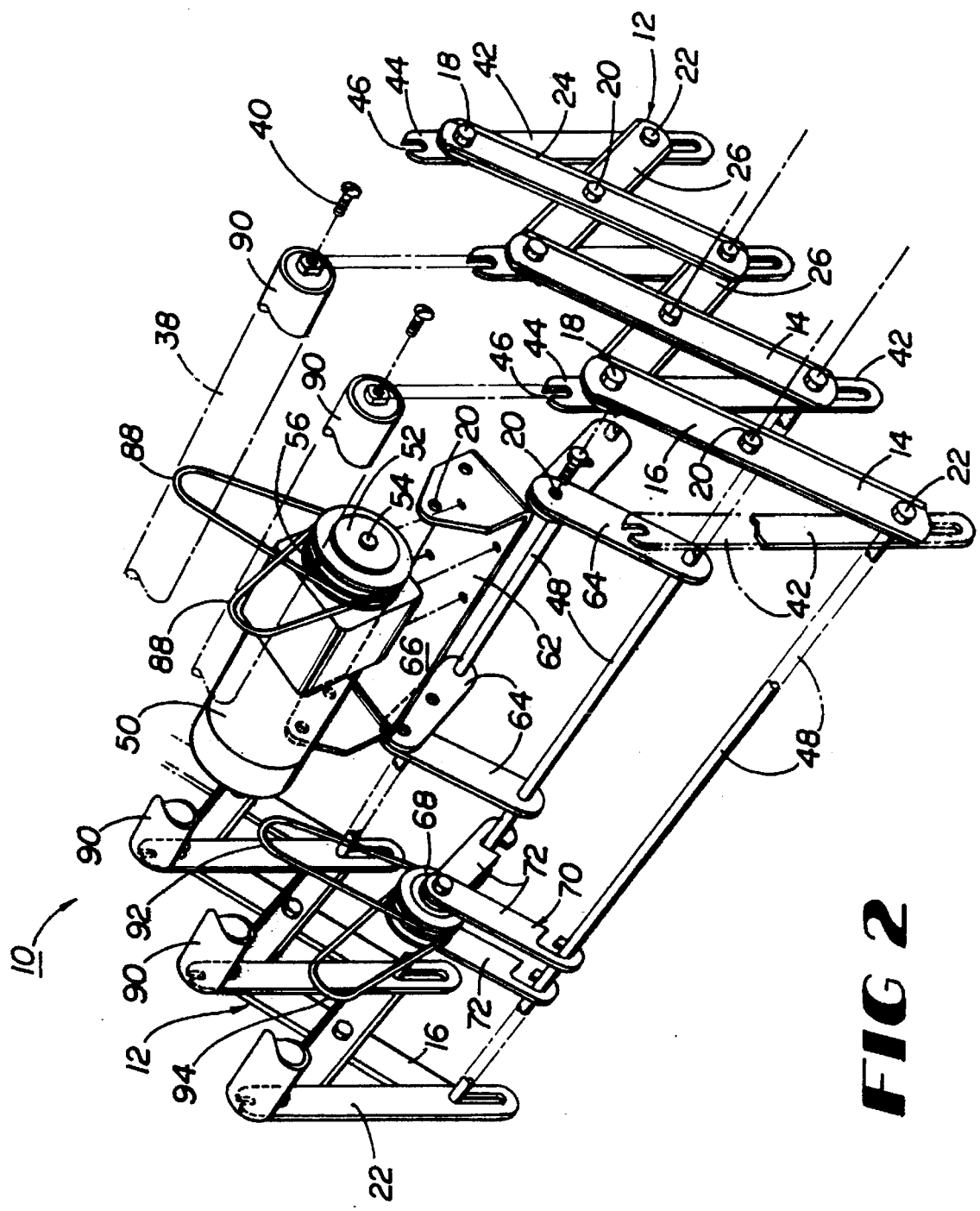
FIG. 2 is a partially exploded view of a portion of the conveyor of FIG. 1.

Motors 50 may be connected to lateral members 48 spanning lower connection points 22 by cradles 62. Each cradle comprises a plurality of links connected in pivoting fashion to motor 50 and in pivoting and quick disconnect fashion to lateral members 48 as shown, for instance, more clearly in FIG. 2. Links 64 thus, in this configuration, always parallel portions of corresponding scissor bars 16 between middle connecting points 20 and lower connecting points 22. As shown in FIG. 2, a cradle frame 66 may be connected to the point at which links 64 are pivotally connected; the cradle is configured to connect as by bolts to motor 50. As shown in FIG. 2, cradle frame 66 preferably extends laterally beyond drive pulley 52 so that the axis of the pulley 52 may be substantially coaxial with middle connection points 20. Additionally, belts 58 may easily be looped under drive pulleys 52 for quick replacement using this configuration.

Conveyors of the present invention 10 also include transfer pulleys 68 which are mounted substantially coaxial to middle connection points 20 so as to remain substantially at a constant distance from axes of rollers 38. As shown in FIGS. 1, 2 and 5–10, transfer pulleys 68 are also preferably connected to lateral members 48 which span lower connection points 22. Transfer pulleys 68 may, however, just as easily be mounted on lateral members 48 which span middle connection points 20. The structure shown in FIGS. 1, 2 and 5–10, however, allow quick removal of transfer pulleys 68, as well as easy replacement of drive belts 58.

Figure 5:
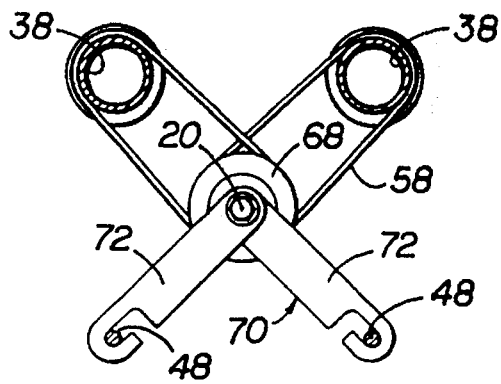
FIG. 5 is a schematic cross-sectional view of a first embodiment of a transfer pulley of a conveyor according to the present invention.
Figure 9:
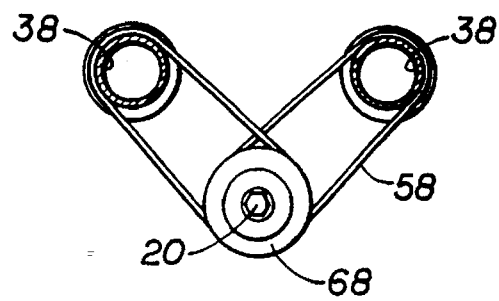
FIG. 9 is a schematic side elevational view of a third embodiment of a transfer pulley of a conveyor according to the present invention.
Figure 6:
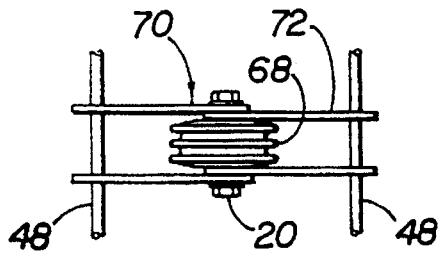
FIG. 6 is a schematic top plan view of a first embodiment of a transfer pulley of a conveyor according to the present invention.
Figure 10:
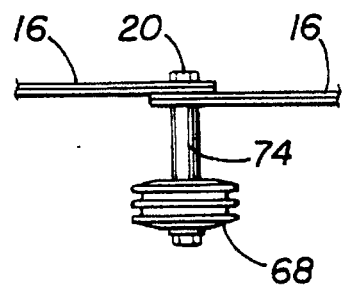
FIG. 10 is a plan view of the transfer pulley embodiment of FIG. 9.
Figure 7:
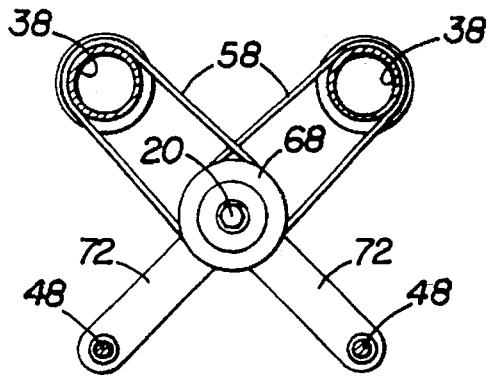
FIG. 7 is a schematic side elevational view of a second embodiment of a transfer pulley of a conveyor according to the present invention.
Figure 8:
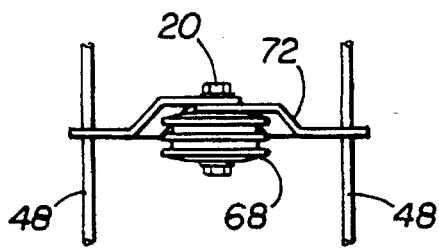
FIG. 8 is a plan view of the transfer pulley embodiment of FIG. 7.

As shown in those drawings, each transfer pulley 68, which may contain one or more channels 56, is mounted via an axle to a cradle 70. The cradle again comprises a plurality of links 72 in the preferred embodiment which extend between their transfer pulley 68 axle and lateral members 48. Four links 72 may be employed as shown in FIG. 2, two extending from one side of a transfer pulley 68 to successive lateral members 48. FIGS. 5 and 6 show this structure more clearly. FIGS. 7 and 8 show a single pair of links 72 which may be bent so that the forces imposed on transfer pulley 68 by drive belts 58 are substantially coplanar with the point at which links 72 connect with lateral members 48. FIGS. 9 and 10 show a third embodiment in which links 72 connect rigidly, but pivotally, to an extension 74 on which transfer pulley 68 is mounted; the extension 74 of this version connects to a truss 12 middle connection 20 rather than a lateral member 48.

Figure 11:
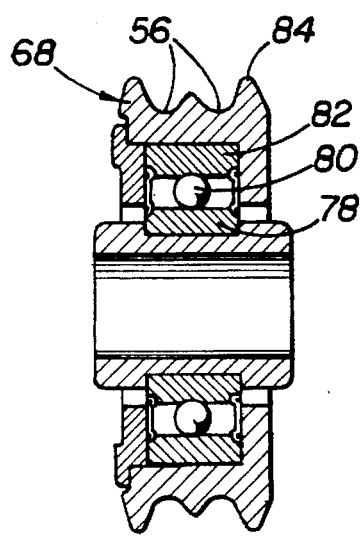
FIG. 11 is a cross-sectional view of a transfer pulley according to a preferred embodiment of the present invention.

FIG. 11 shows a cross-sectional view of a preferred embodiment of a transfer pulley 68 according to the present invention. The pulley includes a bushing of delrin or other desired material which holds an inner race 78 which, in turn and via bearings 80, supports outer race 82 of a ball bearing assembly. Outer race 82 supports sheave 84 which contains one or more channels 56 for accommodating drive belts 58. The bearings, races and sheives may be formed of any desired materials.

Figure 3:
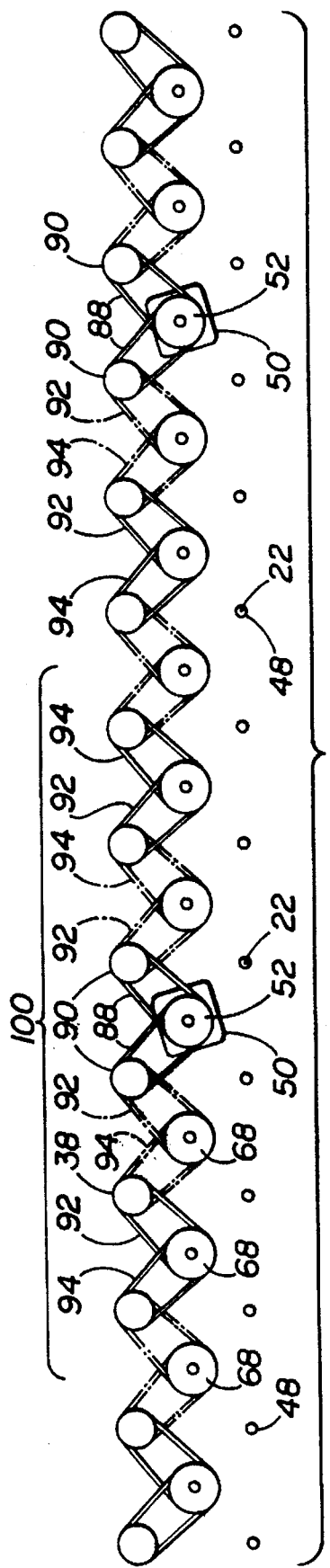
FIG. 3 is a schematic side elevational view of a portion of the conveyor of FIG. 1.

As shown schematically in FIGS. 3 and 4, motors 50 in combination with transfer pulleys 68 and belts 58 may power some or all rollers 38 of the present invention. For example, a particular motor 50 via its drive pulley 52 powers a pair of motor drive belts 88. These motor drive belts 88 extend between the motor 50 pulley 52 and the rollers 38 connected to upper connection points 18 of bars 16 to whose middle connection points 20 motor 50 is substantially coaxial. These first powered rollers 90 are then connected via first transfer drive belts 92 to transfer pulleys 68. In turn, the transfer pulleys 68 are connected via second transfer drive belts 94 to successive rollers 96. The successive rollers 96 may be, in turn, connected via first and second transfer drive belts 92 and 94, and transfer pulleys 68, to further successive rollers 98.

A set of rollers 38 powered directly or indirectly by a motor 50, motor drive belts 88, first and second transfer drive belts 92 and 94, and transfer pulleys 68 may be considered as zone 100. Zones may be connected to each other by belts 58 so that motors 50 act in ganged fashion up and down the conveyor length. Alternatively, zones 100 may be separate and not connected via belts 58, so that a zone 100 may be independently controlled via independent actuation and control of its particular motor 50 as disclosed in U.S. patent application Ser. No. 08/022,012, or as otherwise desired for accumulation of product or other good reasons for configuring rollers 38 in zones.

Conveyors 10 according to the present invention may be easily maintained. For instance, when a belt 58 breaks, the preferred embodiment shown in FIGS. 1–4 allows rollers 38 simply to be quickly disconnected as by pulling axles 40 from quick disconnect structure 46 of bars 42; the elongated rollers 38 simply slide out of the trusses 12. Then, a new belt 58 may be looped under drive pulley 52 or transfer pulleys 68 as desired. If a transfer pulley 68 fails, it may be easily removed via the slotted connections of links 72 shown in FIG. 2 which capture lateral members 48. Motors 58 may also be easily removed and maintained if they ever fail.

The foregoing has been provided for purposes of illustration and explanation of a preferred embodiment of the present invention. Modifications, additions and omissions may be made to the structure or techniques disclosed without departing from the scope or spirit of the invention.

What is claimed is:

1. A powered conveyor, comprising:
   a. a pair of expandable trusses, each truss comprising:
      (1) a first set of scissor bars, at least some of which include an upper connection point, a lower connection point and a middle connection point;
      (2) a second set of scissor bars, at least some of which include an upper connection point, a lower connection point and a middle connection point, and at least some of which are each pivotally connected to bars of the first set of scissor bars at their upper, lower and middle connection points to form the truss;
   b. a plurality of lateral members connected to and spanning connection points of the expandable trusses;
   c. a plurality of elongated rollers connected to and spanning the upper connection points of the expandable trusses, at least some of which rollers contain at least one groove around their circumference;

d. a plurality of drive motors, each connected to a drive pulley and supported by at least one of the lateral members so that its drive pulley is substantially coaxial to a middle connection point;

e. a plurality of transfer pulleys, each supported by at least one of the lateral members substantially coaxial to a middle connection point;

f. a plurality of motor drive belts, each connecting a drive pulley to a roller groove; and g. a plurality of transfer drive belts, each connecting a transfer pulley to a roller groove.

2. A conveyor according to claim 1 further comprising, connected to each truss, a plurality of vertical bars, each of which is pivotally connected to an upper connection point, slidably connected to a lower connection point, and includes a quick release point in its upper portion for connection to an elongated roller.

3. A conveyor according to claim 2 in which the rollers are connected in quick release fashion to the quick release points of vertical bars.

4. A conveyor according to claim 2 in which the quick release points are slots formed in the upper portions of the vertical bars and the rollers are mounted on axles which are captured in the slots.

5. A conveyor according to claim 1 in which a plurality of the lateral members span lower connection points and in which the motors are supported by such lateral members.

6. A conveyor according to claim 5 in which each motor is connected to lateral members spanning lower connection points via a cradle comprising a plurality of links spanning the motor and the lateral members.

7. A conveyor according to claim 6 in which at least some of the links are connected to at least one lateral member in quick release fashion.

8. A conveyor according to claim 1 in which a plurality of the lateral members span lower connection points and in which the transfer pulleys are supported by such lateral members.

9. A conveyor according to claim 8 in which each transfer pulley is connected to lateral members spanning lower connection points via a cradle comprising a plurality of links spanning the motor and the lateral members.

10. A conveyor according to claim 9 in which at least some of the links are connected to at least one lateral member in quick release fashion.

11. A conveyor according to claim 1 comprising a plurality of power zones, each comprising at least one motor, at least one drive belt connecting the motor to a first roller, at least one first transfer belt connecting the first roller to a transfer pulley, and at least one second transfer belt connecting the transfer pulley to a successive roller.

12. A conveyor according to claim 11 further comprising at least one additional transfer belt connecting the successive roller to an additional transfer pulley and at least one further transfer belt connecting the additional transfer pulley to a further roller.

13. A conveyor according to claim 11 comprising at least two first rollers.

14. A conveyor according to claim 11 in which each zone is adapted to be controlled independently.

15. A powered conveyor, comprising:

a. a pair of expandable trusses, each truss comprising:
   (1) a first set of scissor bars, at least some of which include an upper connection point, a lower connection point and a middle connection point;
   (2) a second set of scissor bars, at least some of which include an upper connection point, a lower connection point and a middle connection point, and at least some of which are each pivotally connected to bars of the first set of scissor bars at their upper, lower and middle connection points to form the truss;

b. a plurality of lateral members connected to and spanning connection points of the expandable trusses;

c. a plurality of elongated rollers connected to and spanning the upper connection points of the expandable trusses, at least some of which rollers contain at least one groove around their circumference; and d. a plurality of power zones, each comprising:
   (1) a drive motor connected to a drive pulley and supported by at least one of the lateral members so that its drive pulley is substantially coaxial to a middle connection point;
   (2) at least one transfer pulley, supported by at least one of the lateral members substantially coaxial to a middle connection point;
   (3) at least one motor drive belt connecting a drive pulley to a first roller;
   (4) at least one first transfer drive belt connecting a first roller to a transfer pulley;
   (5) at least one second transfer belt connecting a transfer pulley to a successive roller.

16. A conveyor according to claim 15 further comprising at least one additional transfer belt connecting the successive roller to an additional transfer pulley and at least one further transfer belt connecting the additional transfer pulley to a further roller.

17. A conveyor according to claim 15 comprising at least two first rollers.

18. A conveyor according to claim 15 in which each zone is adapted to be controlled independently.

19. A conveyor according to claim 15 further comprising, connected to each truss, a plurality of vertical bars, each of which is pivotally connected to an upper connection point, slidably connected to a lower connection point, and includes a quick release point in its upper portion for connection to an elongated roller.

20. A conveyor according to claim 19 in which the rollers are connected in quick release fashion to the quick release points of vertical bars.

21. A conveyor according to claim 19 in which the quick release points are slots formed in the upper portions of the vertical bars and the rollers are mounted on axles which are captured in the slots.

22. A conveyor according to claim 15 in which a plurality of the lateral members span lower connection points and in which the motors are supported by such lateral members.

23. A conveyor according to claim 22 in which each motor is connected to lateral members spanning lower connection points via a cradle comprising a plurality of links spanning the motor and the lateral members.

24. A conveyor according to claim 23 in which at least some of the links are connected to at least one lateral member in quick release fashion.

25. A conveyor according to claim 15 in which a plurality of the lateral members span lower connection points and in which the transfer pulleys are supported by such lateral members.

26. A conveyor according to claim 25 in which each transfer pulley is connected to lateral members spanning lower connection points via a cradle comprising a plurality of links spanning the motor and the lateral members.

27. A conveyor according to claim 26 in which at least some of the links are connected to at least one lateral member in quick release fashion.

28. A powered conveyor, comprising:
a. a pair of expandable trusses, each truss comprising:
   (1) a first set of scissor bars, at least some of which include an upper connection point, a lower connection point and a middle connection point;
   (2) a second set of scissor bars, at least some of which include an upper connection point, a lower connection point and a middle connection point, and at least some of which are each pivotally connected to bars of the first set of scissor bars at their upper, lower and middle connection points to form the truss; and
   (3) a plurality of vertical bars, each pivotally connected to an upper connection point and slidably connected to a lower connection point, and featuring a quick release connection in its upper portion;
b. a plurality of lateral members connected to and spanning lower connection points of the expandable trusses;
c. a plurality of elongated rollers connected to and spanning the quick release connections of the vertical bars of the expandable trusses;
d. a plurality of drive motors, each connected to a drive pulley and supported by at least two of the lateral members so that its drive pulley is substantially coaxial to a middle connection point;
e. a plurality of transfer pulleys, each supported by at least two of the lateral members substantially coaxial to a middle connection point;
f. a plurality of motor drive belts, each connecting a drive pulley to a roller; and
g. a plurality of transfer drive belts, each connecting a transfer pulley to a roller groove.

29. A conveyor according to claim 28 comprising a plurality of power zones, each comprising at least one motor, at least one drive belt connecting the motor to a first roller, at least one first transfer belt connecting the first roller to a transfer pulley, and at least one second transfer belt connecting the transfer pulley to a successive roller.

30. A conveyor according to claim 29 further comprising at least one additional transfer belt connecting the successive roller to an additional transfer pulley and at least one further transfer belt connecting the additional transfer pulley to a further roller.

31. A conveyor according to claim 29 comprising at least two first rollers.

32. A conveyor according to claim 29 in which each zone is adapted to be controlled independently.

33. A conveyor according to claim 30 in which the zones are connected via belts.

* * * * *